United States Patent
Slater et al.

(10) Patent No.: US 10,496,496 B2
(45) Date of Patent: Dec. 3, 2019

(54) DATA RESTORATION USING ALLOCATION MAPS

(71) Applicant: HEWLETT PACKARD ENTERPRISE DEVELOPMENT LP, Houston, TX (US)

(72) Inventors: Alastair Michael Slater, Chepstow (GB); Mark Robert Watkins, Bristol (GB); Gowtam Chandra Karanth, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 96 days.

(21) Appl. No.: 15/330,000

(22) PCT Filed: Dec. 15, 2014

(86) PCT No.: PCT/US2014/070421
§ 371 (c)(1),
(2) Date: Jan. 27, 2017

(87) PCT Pub. No.: WO2016/069030
PCT Pub. Date: May 6, 2016

(65) Prior Publication Data
US 2018/0165161 A1    Jun. 14, 2018

(30) Foreign Application Priority Data

Oct. 29, 2014   (IN) .......................... 5401/CHE/2014

(51) Int. Cl.
*G06F 16/00* (2019.01)
*G06F 11/14* (2006.01)
(Continued)

(52) U.S. Cl.
CPC .......... *G06F 11/1469* (2013.01); *G06F 3/065* (2013.01); *G06F 3/0619* (2013.01);
(Continued)

(58) Field of Classification Search
CPC ............. G06F 11/1456; G06F 11/1469; G06F 11/1458; G06F 11/1453; G06F 16/128;
(Continued)

(56) References Cited

U.S. PATENT DOCUMENTS 5,517,632 A * 5/1996 Matsumoto ........... G06F 3/0601
                                                                711/114
6,341,341 B1    1/2002 Grummon et al.
(Continued)

FOREIGN PATENT DOCUMENTS

| EP | 1476810 | 6/2010 |
|---|---|---|
| EP | 2333653 | 6/2011 |
| JP | 2005018233 | 1/2005 |

OTHER PUBLICATIONS

European Patent Office, "Communication pursuant to Article 94(3) EPC", dated Feb. 23, 2018, issued in European Patent App. No. 14905010.6.

(Continued)

*Primary Examiner* — Anh Ly
(74) *Attorney, Agent, or Firm* — International IP Law Group, PLLC

(57) ABSTRACT

A method is described herein. The method includes generating an allocation map for a backup. The method also includes storing the allocation map in a storage device. The method further includes reading the allocation map to skip reading empty blocks during storing of a file from the backup. The method also further includes and reading the allocation map to skip writing zeros to a formatted target disk during a restore session of a file from the backup.

15 Claims, 7 Drawing Sheets

(51) Int. Cl.
*G06F 16/11* (2019.01)
*G06F 3/06* (2006.01)

(52) U.S. Cl.
CPC .......... *G06F 3/0641* (2013.01); *G06F 3/0689* (2013.01); *G06F 11/1453* (2013.01); *G06F 16/128* (2019.01); *G06F 2201/84* (2013.01)

(58) Field of Classification Search
CPC ...... G06F 3/0641; G06F 3/0619; G06F 3/065; G06F 3/0689; G06F 2201/84
See application file for complete search history.

(56) References Cited

U.S. PATENT DOCUMENTS

| | | | |
|---|---|---|---|
| 6,779,094 B2* | 8/2004 | Selkirk | G06F 3/0605 |
| | | | 711/162 |
| 7,231,409 B1 | 6/2007 | Chen | |
| 7,596,713 B2 | 9/2009 | Mani-Meitay et al. | |
| 7,620,666 B1 | 11/2009 | Root et al. | |
| 7,797,693 B1* | 9/2010 | Gustafson | G06F 11/1433 |
| | | | 711/100 |
| 7,870,356 B1* | 1/2011 | Veeraswamy | G06F 3/0607 |
| | | | 711/100 |
| 7,930,499 B2 | 4/2011 | Duchesne | |
| 8,095,756 B1 | 1/2012 | Somavarapu et al. | |
| 8,099,391 B1 | 1/2012 | Monckton | |
| 8,127,096 B1 | 2/2012 | Chatterjee et al. | |
| 8,209,587 B1* | 6/2012 | Taylor | G06F 11/1096 |
| | | | 711/114 |
| 8,234,469 B2 | 7/2012 | Renade | |
| 8,244,681 B2 | 8/2012 | Laffin | |
| 8,356,148 B2 | 1/2013 | Popovski et al. | |
| 8,392,679 B2 | 3/2013 | Okada et al. | |
| 8,417,896 B2 | 4/2013 | Mizushima | |
| 8,533,189 B2 | 9/2013 | Van Ingen | |
| 8,539,179 B1 | 9/2013 | Stringham | |
| 8,650,162 B1 | 2/2014 | Vaikar et al. | |
| 8,738,870 B1 | 5/2014 | Balasubramanian et al. | |
| 8,751,454 B1* | 6/2014 | Bushman | G06F 3/061 |
| | | | 707/640 |
| 8,914,567 B2 | 12/2014 | Miroshnichenko et al. | |
| 9,152,507 B1* | 10/2015 | Bushman | G06F 11/1469 |
| 9,535,800 B1 | 1/2017 | Natanzon et al. | |
| 9,542,379 B1* | 1/2017 | Joshi | G06F 17/248 |
| | | | 707/604 |
| 2002/0083037 A1 | 6/2002 | Lewis et al. | |
| 2003/0188229 A1* | 10/2003 | Lubbers | G06F 11/2064 |
| | | | 714/47.2 |
| 2004/0268070 A1 | 12/2004 | Hasegawa | |
| 2007/0174673 A1* | 7/2007 | Kawaguchi | G06F 11/1458 |
| | | | 714/6.12 |
| 2007/0250674 A1 | 10/2007 | Fineberg et al. | |
| 2007/0260839 A1* | 11/2007 | Arndt | G06F 13/28 |
| | | | 711/165 |
| 2008/0005468 A1* | 1/2008 | Faibish | G06F 3/0622 |
| | | | 711/114 |
| 2008/0282047 A1 | 11/2008 | Arakawa et al. | |
| 2010/0250880 A1 | 9/2010 | Mimatsu | |
| 2011/0010496 A1* | 1/2011 | Kirstenpfad | G06F 16/10 |
| | | | 711/114 |
| 2011/0093437 A1 | 4/2011 | Sampathkumar | |
| 2011/0107025 A1 | 5/2011 | Urkude et al. | |
| 2011/0246425 A1* | 10/2011 | Munoz | G06F 11/1458 |
| | | | 707/640 |
| 2012/0143835 A1 | 6/2012 | Aronovich et al. | |
| 2012/0233417 A1 | 9/2012 | Kalach et al. | |
| 2013/0159646 A1 | 6/2013 | Atzmon et al. | |
| 2013/0226884 A1 | 8/2013 | Provenzano | |
| 2013/0246726 A1* | 9/2013 | Kirstenpfad | G06F 16/10 |
| | | | 711/162 |
| 2014/0059313 A1 | 2/2014 | Hwang et al. | |
| 2014/0095816 A1 | 4/2014 | Hsu et al. | |
| 2014/0317369 A1 | 10/2014 | Wade et al. | |
| 2015/0081994 A1* | 3/2015 | Christopher | G06F 11/1458 |
| | | | 711/162 |
| 2015/0095596 A1* | 4/2015 | Yang | G06F 3/061 |
| | | | 711/162 |
| 2015/0161159 A1 | 6/2015 | Provenzano et al. | |
| 2017/0177222 A1* | 6/2017 | Singh | G06F 3/061 |

OTHER PUBLICATIONS

Veeam Software. Excerpts from "How it Works. Part One," (excerpts "Introduction" through "VeeamZIP"). Jul. 21, 2014. Veeam Backup & Replication v7. Veeam University, <https://web.archive.org/web/20140721213833/https://www.veeam.com/university-course/backup-replication-how-it-works.html>.

International Search Report & Written Opinion received in PCT Application No. PCT/US2014/065945, dated Jul. 31, 2015, 11 pages.

International Search Report & Written Opinion received in PCT Application No. PCT/US2014/070421, dated Jun. 29, 2015, 14 pages.

Peterson, Z.N.J., "Data Placement for Copy-On-Write Using Virtual Contiguity," (Research Paper), Diss. University of California Santa Cruz, Sep. 2002, 67 pages, available at http://www.znjp.com/papers/peterson-UCSC-MS02.pdf.

Shen, R., "Optimizing Data Backup with Intelligent File Virtualization," (Research Paper), copyright 2012, F5.com, White Paper, 16 pages, available at http://www.f5.com/pdf/white-papers/white-paperoptimizing-data-backup-with-intelligent-file-virtualization.pdf.

Computer Weekly, "Snapshot Technology: the Role of Snapshots in Today's," Jan. 20, 2011, http://www.computerweekly.com/tutorial/Snapshot-technology-The-role-of-snapshots-in-todays-backup-environments.

International Searching Authority, International Search Report, dated Aug. 24, 2016, issued in International Patent App. No. PCT/US2016/024277.

International Searching Authority, Written Opinion, dated Aug. 24, 2016, issued in International Patent App. No. PCT/US2016/024277.

European Patent Office, "Extended European Search Report," dated Jul. 10, 2017, issued in European Patent App No. 14905010.6.

Lance Ashdown, "RMAN Backup Concepts," Oracle Database, Backup and Recovery User's Guide, Chapter 8, Jul. 2013, pp, 8-1-8-21, https://web.archive.org/web/20140528015237/https://docs.oracle.com/cd/E11882_01/backup.112/e10642.pdf.

Wikipedia, "Thin Provisioning", available online at <https://web.archive.org/web/20160924180327/https://en.wikipedia.org/wiki/Thin_provisioning>, Sep. 24, 2016, 3 pages.

Wikipedia, "Design of the FAT File System,", available online at <https://web.archive.org/web/20161224003928/https://en.wikipedia.org/wiki/Design_of_the_FAT_file_system>, Dec. 24, 2016, 26 pages.

Weinsheimer, "EMC Data Domain Boost: What is it and Why it's Beneficial", available online at <http://blog.clearpathsg.com/blog/bid/360477/emc-data-domain-boost-what-is-it-and-why-it-s-beneficial>. Jan. 29, 2015, 6 pages.

Veeam Software, "Persistent VSS Snapshots",https://helpcenter.veeam.com/docs/backup/vsphere/persistent_snapshots.html?ver=95>, Jul. 12, 2017, 2 pages.

Symantec Corporation, "OpenStorage API Part II", OpenStorage API Training, 2011, 26 pages.

Symantec Corporation, "Symantec NetBackup™ 7.5 Technical Brief", 2012, 20 pages.

Symantec Corporation, "Blueprint for NetBackup Accelerator", Symantec NetBackup Blueprints, Symantec Backup and Recovery Technical Services, Jan. 12, 2015, 27 pages.

Symantec Corporation, "Blueprint for Accelerator for VMware", Symantec NetBackup Blueprints, Symantec Backup and Recovery Technical Services, Jan. 12, 2015, 38 pages.

Rasheed, "Frequently Asked Questions on NetBackup Accelerator", available online at <https://vox.veritas.com/t5/Netting-Out-NetBackup/Frequently-Asked-Questions-on-NetBackup-Acceleratort/bap/780204>, Jul. 3, 2012, 25 pages.

(56) References Cited

OTHER PUBLICATIONS

Qrange, "[Solved] DD Skip Empty Sectors", Linuxquestions.org, available online at <https://www.linuxquestions.org/questions/linux-software-2/ dd-skip-empty-sectors-914497/>, Nov. 21, 2011, pp. 1-3.
May, "EMC ProtectPoint Overview", available online at <http://www.storagereview.com/emc_protectpoint_overview>. Aug. 6, 2014, 2 pages.
Itzikr's, "EMC ProtectPoint, Now Support XtremIO", available online at <https://xtremio.me/2015/11/12/emc-protectpoint-now-support-xtremio/>, Nov. 12, 2015, 11 pages.
Gordon, "Excerpts from: EMC ProtectPoint Overview Video", available online at <https://www.emc.com/collateral/demos/microsites/mediaplayer-video/protectpoint-overview.htm>, Jul. 8, 2014, 5 pages.
Google, "Creating Persistent Disk Snapshots", available online at <https://cloud.google.com/compute/docs/disks/create-snapshots>, May 12, 2017, 9 pages.
GFK, "NetBackup 7.6 Blueprints—Accelerator", Veritas Open Exchange, availble online at <https://vox.veritas.com/t5/Articles/NetBackup-7-6-Blueprints-Accelerator/ta-p/808665>, Jan. 12, 2015, 2 pages.
EMC Corporation, "EMC Networker and EMC Data Domain Boost", Best Practices Planning, Nov. 2010, pp. 1-24.
EMC Corporation, "EMC Data Domain Boost for Symantec NetBackup OpenStorage", Best Practices Planning, <https://www.emc.com/collateral/software/white-papers/h7296-data-domain-boost-openstorage-wp.pdf>, Feb. 2013, 45 pages.
EMC Corporation, "Protectpoint 3.1 File System Agent With Vmax—Backup & Recovery Best Practice for Oracle on ASM,", Oct. 2016, 60 pages.
Dell EMC, "Data Domain Boost," Details, available online at <https://www.emc.com/data-protection/data-domain/data-domain-boost.htm#!details>. Dec. 1, 2017, 1 page.
Dell EMC Engineering, "The Dell EMC VMAX All Flash Family Overview", Apr. 2018, 44 pages.
Crvelin, "What's the Point of ProtectPoint?", availble online at <https://community.emc.com/people/ble/blog/2014/07/08/whats-the-point-of-protectpoint>, Jul. 8, 2014, 8 pages.
Corbet: "The Return of SEEK_HOLE", LWN, XP055472622, available online at <URL:https://lwn.net/Articles/440255/>Apr. 28, 2011, pp. 1-17.
Burton, "What Is Data Domain Boost and What Is It Used for?", SearchDataBackup.com, available online at <http://searchdatabackup.techtarget.com/answer/What-is-Data-Domain-Boost-and-what-is-it-used-for?vgnextfmt=print>,Nov. 25, 2014, 1 page.

* cited by examiner

200

US 10,496,496 B2

DATA RESTORATION USING ALLOCATION MAPS

BACKGROUND

A data protection system can use snapshots to record the state of a computing system at a point in time onto a disk array. A snapshot is a set of pointers that can be used to restore the state of a disk to the particular time that the snapshot was taken. For example, a base virtual volume can be used to store an initial state of a protected system to a disk array, and snapshot virtual volumes indicating differences from the base virtual volume can then be stored on the disk array. Once the snapshots are saved, the data can be backed up onto a storage device.

BRIEF DESCRIPTION OF THE DRAWINGS

Certain example implementations are described in the following detailed description and in reference to the drawings, in which.

DETAILED DESCRIPTION

In some systems, a restore can be performed by reading a backup from a storage device containing a backup and restoring the data to a target disk. Although techniques such as thin disk provisioning and deduplication may also be used to save disk space, a significant portion of disk space in a backup is generally unallocated at any point in time. For example, such unallocated disk space may be represented by rows of zeros in a logical disk.

This disclosure describes techniques for restoring a file from a backup using an allocation map to avoid reading and writing unallocated blocks in the backup. As used herein, the term "backup" refers to a full backup and any snapshots, and the term "allocation map" refers to a block device representation that represent unallocated blocks and allocated blocks of the block device. The term "target" refers to the location to which a file from the backup is to be restored. A file from a backup residing in a storage device of a backup storage system and hosted in a data protection server can be restored to a target server connected to a target storage system. Unallocated blocks in a full backup are skipped during reading of the backup and writing of the backup.

Figure 1:
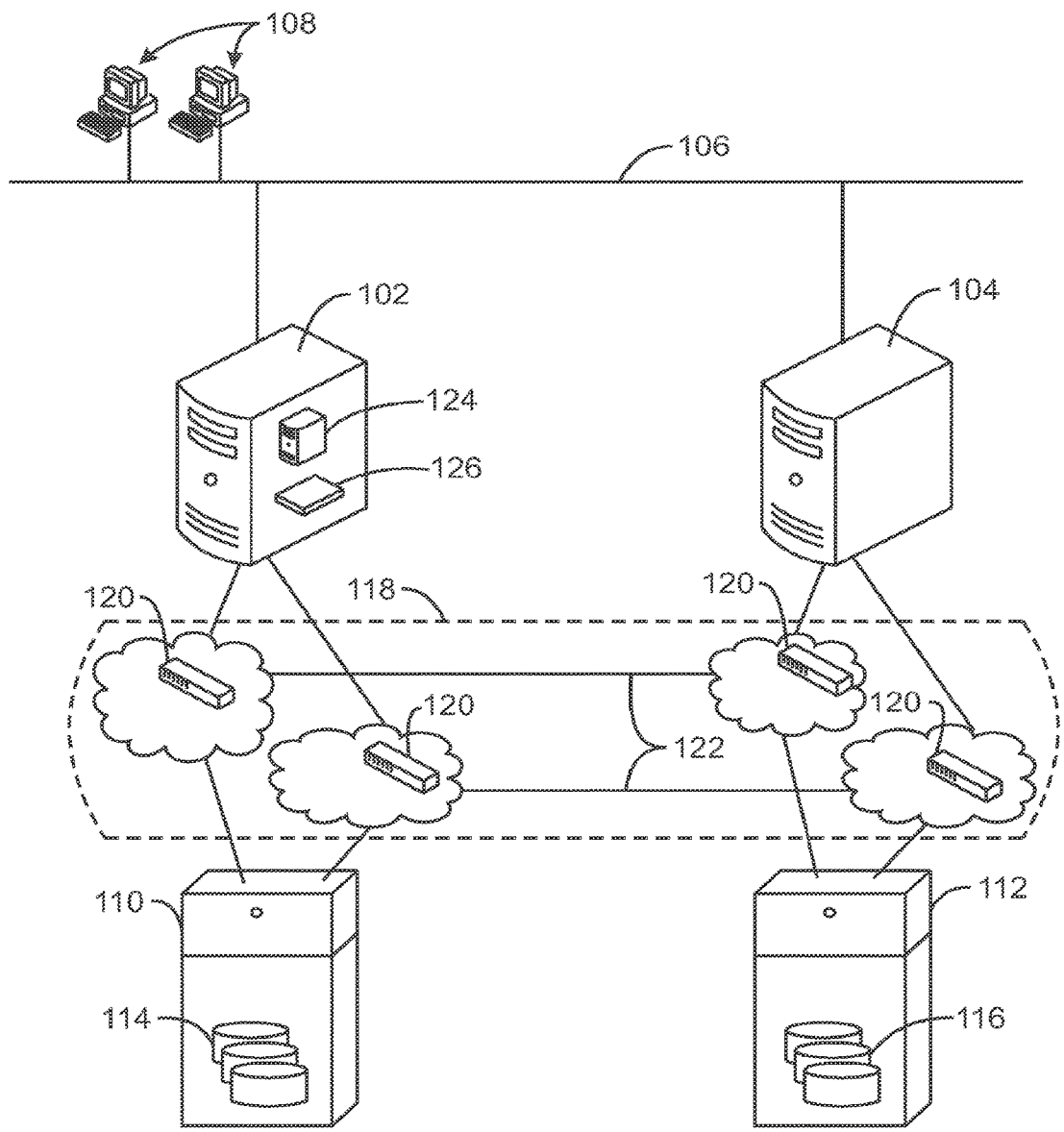
FIG. 1 is a diagram of an example server network, in accordance with an example implementation of the present techniques.

FIG. 1 is a diagram of an example server network, in accordance with an example implementation of the present techniques. The server network is generally referred to by the reference number 100. As shown in FIG. 1, the server network 100 can include a backup server 102 and a target server 104 operatively coupled by a communications network 106, for example, a wide area network (WAN), local area network (LAN), virtual private network (VPN), the Internet, and the like. The communications network 106 can be a TCP/IP protocol network or any other appropriate protocol. Any number of clients 108 can access the servers 102, 104 through the communications network 106. Each server 102, 104 can also be operatively connected to a data storage system 110, 112 that includes storage devices 114, 116, such as an array of physical storage disks. The servers 102, 104 can access the data storage systems 110, 112 through a storage area network 118, which can include a plurality of switches 120 coupled by data links 122, for example, Ethernet interface connections, Fibre Channel links, SCSI (Small computer System Interface) interfaces, among others. In some examples, the data links 122 are part of the storage area network 118. Although physical connections are shown, the data links 122 can also include virtual links routed through the communications network 110, for example, using Fibre Channel over Ethernet (FCoE) or Fibre Channel over IP (FCIP).

The server 102 can host one or more virtual machines 124, each of which provides an operating system instance to a client 108. In some examples, the clients 108 access the virtual machine 124 in a location transparent manner. The storage data associated with the virtual machine 124 can be stored to the corresponding data storage system 110. In some examples, the virtual machine 124 running on the server 102 resides on the data storage system 110.

The server 102 also includes an allocation map 126. The virtual machine 124 can restore a file from a backup from the data storage system 110 on one physical server 102 to the data storage system 112 of another physical server 104. As described in relation to FIG. 2, the virtual machine 124 can use the allocation map 126 to skip reading and writing unallocated portions of a backup. In some examples, the target disk in storage device 116 is preformatted such that the blocks of the target storage disk are unallocated by default.

It will be appreciated that the configuration of the server network 100 is but one example of a network can be implemented in an example implementation of the present techniques. The described server network 100 can be modified based on design considerations for a particular system. For example, a server network 100 in accordance with implementations of the present techniques can include any suitable number of physical servers 102, 104 and any suitable number of data storage systems 110, 112. Further, each server 102 can include one or more virtual machines 124, each of which can be operatively connected to one or more allocation maps 126 of backups containing files to be restored to any other suitable target servers 104. The block diagram of FIG. 1 is not intended to indicate that server network 100 is to include all of the components shown in FIG. 1. Further, the server network 100 can include any number of additional components not shown in FIG. 1, depending on the details of the specific implementation.

Figure 2:
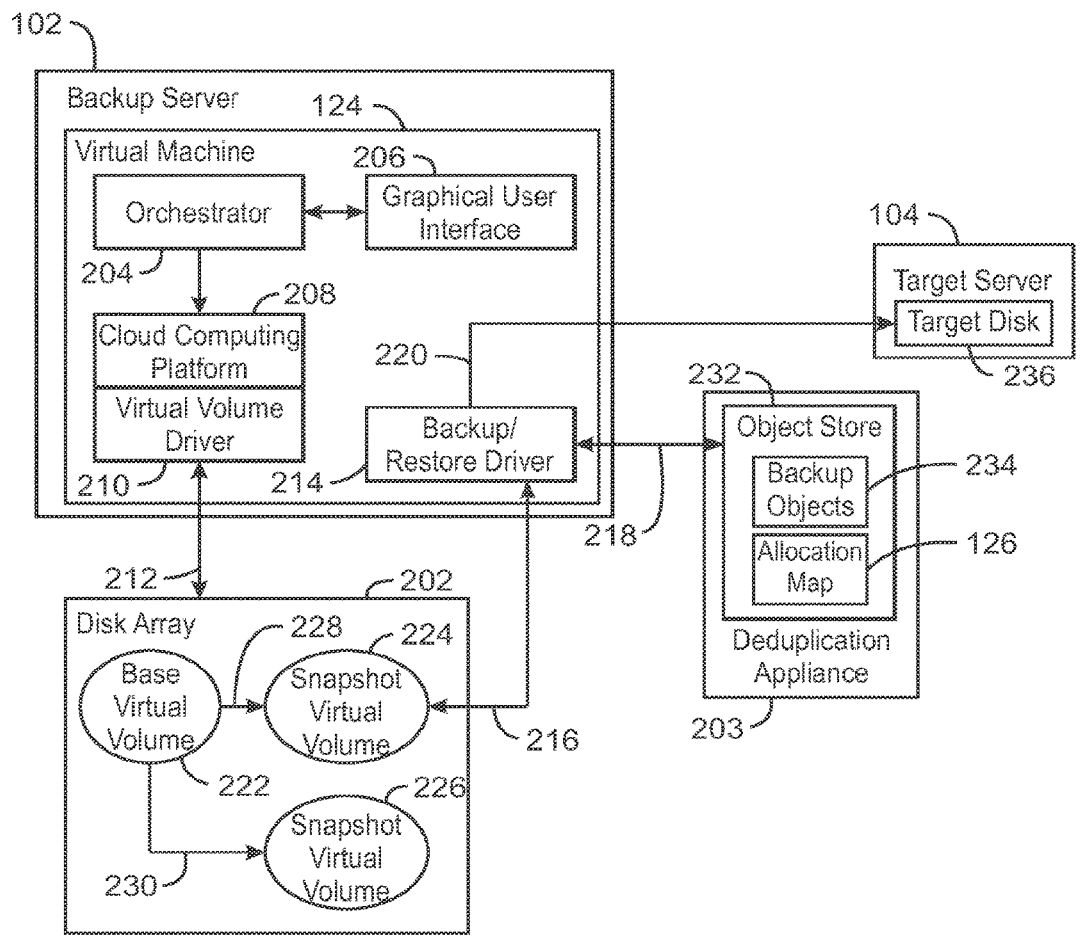
FIG. 2 is a block diagram of an example file restoration system, in accordance with an example implementation of the present techniques.

FIG. 2 is a block diagram of an example file restoration system, in accordance with an example implementation of the present techniques. The example backup restoration system is generally referred to by the reference number 200. As shown in FIG. 2, the backup server 102 includes a virtual machine 124. The virtual machine 124 is operatively connected to a disk array 202 and a deduplication appliance 203. The virtual machine 124 includes an orchestrator 204, a graphical user interface (GUI) 206, a cloud computing platform 208, and a virtual volume driver 210 to interface with disk array 202 as shown by an arrow 212. The virtual machine 124 also includes a backup/restore driver 214 to interface with the disk array 202 and the deduplication appliance 203 as indicated by arrows 216 and 218, respectively. The backup/restore driver 214 is also communicatively connected via a data link 220 to a target disk 224 of a target server 104 as indicated by an arrow 220. For example, the data link 220 can include an iSCSI, Fiber Channel, or any other high-speed data link. The disk array 202 can include a base virtual volume 222. The base virtual volume 222 is connected to snapshot virtual volumes 224, 226 of the disk array 202 as shown by arrows 228, 230, respectively. The deduplication appliance 203 includes an object store 232. The object store 232 includes backup objects 234 and an allocation map 126.

The virtual machine 124 can be a virtual appliance. As used herein, a virtual appliance is a pre-configured virtual machine image that can be made available via electronic download or on a physical storage medium. The virtual machine 124 can take the form of a virtual machine image for use with a hypervisor on the backup server 102. A hypervisor is a piece of computer software, firmware or hardware that can create and run virtual machines. The orchestrator 204 of the virtual machine 124 is used to schedule backups. For example, the orchestrator 204 may receive a backup request from the GUI 206 and send the backup request to the cloud computing platform 208. Backups can be scheduled via the GUI 206 to automatically execute at predetermined intervals, such as, once every day, once every week, or once every month. In some examples, the cloud computing platform 208 includes software used to provide logical volume management for snapshots in conjunction with a virtual volume driver 210. For example, the cloud computing platform 208 can provide disk array agnostic support such that a storage array from any particular vendor can be used. The virtual volume driver 210 can allow virtual volumes to be created on and read from the disk array 202. A virtual volume is a logical disk partition that can span across one or more physical volumes. A physical volume can include a hard disk, hard disk partition, or Logical Unit Numbers (LUNs) of an external storage device.

Still referring to FIG. 2, when an initial backup is performed, a base virtual volume 222 is written to the disk array 202. The base virtual volume 222 can then serve as a base for a snapshot virtual volume 224 as indicated by arrow 228 and as a base for snapshot virtual volume 226 as indicated by arrow 230. For example, the snapshot virtual volumes 224, 226 can be backups of the same system at successive points in time. In some examples, the snapshots are implemented using copy-on-write techniques. In some examples, the disk array 202 uses thin disk provisioning for efficient use of disk space. For example, thin disk provisioning can include on-demand allocation of blocks of data and overallocation of logical disk space.

The backup/restore driver 214 can allow the virtual machine 124 to interface with the snapshots of disk array 202, such as a snapshot 224 as indicated by arrow 216. For example, once a snapshot virtual volume 224 is created on the disk array 202, the backup/restore driver 214 can read the data bytes within the snapshot virtual volume 224 and send the data stream as a backup image in one or more backup objects 234 on an object store 232. The backup/restore driver 214 can use an application program interface (API) from the deduplication appliance 203 to perform source side deduplication on the data. For example, a chunk of data that is duplicated throughout snapshot virtual volume 224 can be stored in a single backup object 234 of object store 232. In some examples, chunk size is predetermined and adjustable. Thus, the backup restore driver 214 can allow the virtual machine 124 to interface with an object store 232 of deduplication appliance 203 as indicated by arrow 218.

Still referring to FIG. 2, the backup/restore driver 214 can create an allocation map during a backup. The allocation map 126 is a map of a backup indicating allocated blocks and unallocated blocks by symbols, as in the example allocation map described in FIG. 3 below. In some examples, the backup/restore driver 214 can save the allocation map 126 onto the object store 232 of deduplication appliance 203.

The backup/restore driver 214 can use the allocation map 126 to avoid reading and writing unallocated blocks during the restore of a file from the backup to a target disk 236. The allocation map 126 can be used to read and restore a snapshot from one or more backup objects 234 to a target disk 236 via data link 220 without reading unallocated blocks of the backup. The backup/restore driver 214 can read the allocation map 126 for a particular backup and determine the unallocated blocks of the backup The backup restore driver 214 can skip over unallocated blocks and read the allocated blocks during restore. The backup/restore driver 214 can also use the allocation map to write the allocated blocks to the target disk 224 without writing zeros representing unallocated blocks. Thus, time and disk resources are saved by not reading zeros from the backup data of the end point deduplication appliance 203 and also by not writing zeros to target disk 236. In some examples, target disk 236 is preformatted. Therefore, target disk 236 can have unallocated blocks by default.

The block diagram of FIG. 2 is not intended to indicate that the backup restoration system 200 is to include all of the components shown in FIG. 2. Further, the backup restoration system 200 can include any number of additional components not shown in FIG. 2, depending on the details of the specific implementation.

Figure 3:
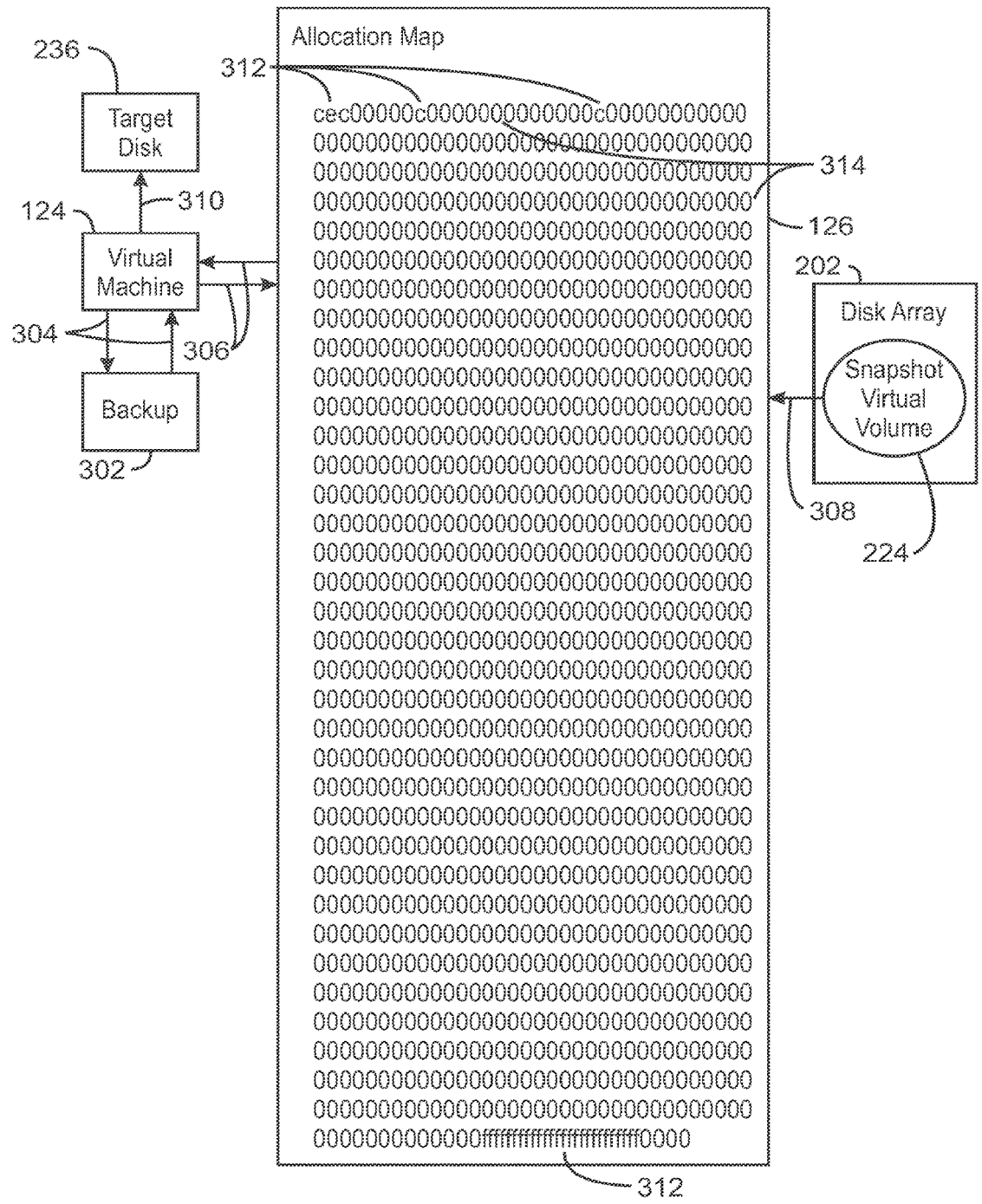
FIG. 3 is a block diagram of an example system with an allocation map, in accordance with an example implementation of the present techniques.

FIG. 3 is a block diagram of an example system with an allocation map 126, in accordance with an example implementation of the present techniques. The example system 300 including allocation map 126 is referred to generally by the reference number 300. As shown in FIG. 3, a virtual machine 124 creates and reads a backup 302 as show by arrows 304. The virtual machine 124 can also create and read allocation map 126 as indicated by arrows 306. The allocation map 126 can be created from a snapshot virtual volume 224 on a disk array 202 as shown by an arrow 308. In some examples, the virtual machine 124 creates an allocation map while storing backup 302 from a snapshot virtual volume 224. The allocation map 126 can be used to restore a file from the backup 302 to the target disk 236 via a data link as shown by arrow 310.

The allocation map 126 includes allocated blocks 312 indicated by non-zero symbols and unallocated blocks 314 indicated by zeros. In some examples, different non-zero hexadecimal symbols can indicate different levels of allocation for each block. The size of a block is can be a variable specified size. For example, the virtual machine 124 can specify the size of a block base to any suitable size. A block may be fully allocated or partially allocated as indicated by a specific non-zero symbol.

The virtual machine 124 can read the allocation map 126 to restore a file from the backup 302. If the virtual machine 124 reads a block as non-zero in the allocation map 126, the virtual machine 124 can read the corresponding block of backup 302 for the backup data that the symbol represents. If the virtual machine 124 reads rows of zeros indicating unallocated blocks 314 in the allocation map 126, then the virtual machine 124 skips over the corresponding blocks in backup 302 when reading the backup 302. In addition, when writing a file from the backup 302 to target disk 236, the virtual machine 124 can avoid the sending and writing of zeros to the target disk 236. Instead, the virtual machine sends offset indicating the next allocated block 312 to be read and written from backup 302.

The block diagram of FIG. 3 is not intended to indicate that the example system 300 is to include all of the components shown in FIG. 3. Further, the example system 300 can include any number of additional components not shown in FIG. 3, depending on the details of the specific implementation.

Figure 4:
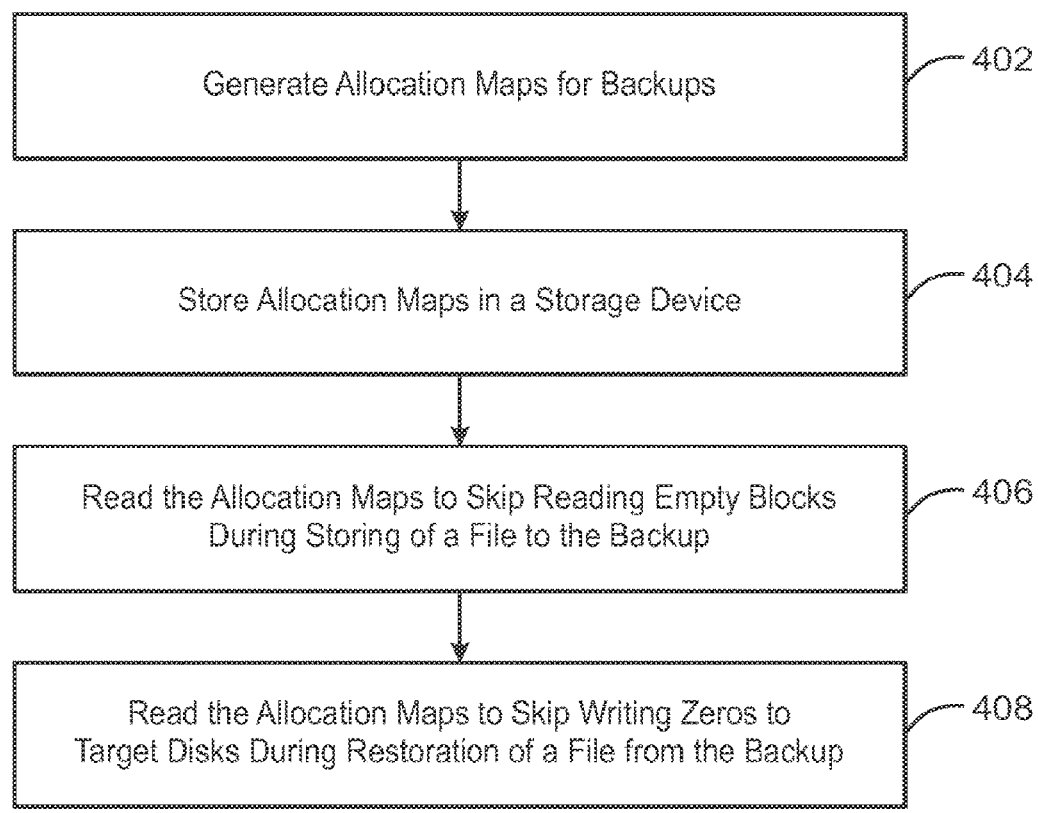
FIG. 4 is a process flow diagram of an example method of restoring files from a backup, in accordance with an example implementation of the present techniques.

FIG. 4 is a process flow diagram of an example method of restoring a file from a backup, in accordance with an example implementation of the present techniques. The method can be referred to by the reference number 400, and is described in reference to the example system of FIG. 2.

The method begins at block 402, wherein virtual machine 124 generates allocation maps 126 for backups. An allocation map 126 represents specific sized blocks of a backup and specifies whether each block is allocated or unallocated. For example, each backup can have an associated allocation map 126 that indicates allocated and unallocated blocks 314 of the backup.

At block 404, the virtual machine 124 stores the allocation maps 126 in a storage device. In some examples, the virtual machine 124 stores the allocation maps 126 in an object store 232. For example, the object store 232 can have a portion of the store 232 dedicated to storing allocation maps 126 for backups stored as backup objects 234.

At block 406, the virtual machine 124 reads the allocation maps 126 to skip reading empty blocks during storing of a file to a backup. For example, virtual machine 124 can receive a read request and first check the corresponding allocation map 126 as discussed in greater detail with respect to FIG. 5 below. The virtual machine 124 can then read the allocated blocks 312 of the requested backup without reading any unallocated blocks 314 of the backup.

At block 408, the virtual machine 124 reads the allocation maps 126 to skip writing zeros to formatted target disks 236 during restoration of the file from the backup. For example, the virtual machine 124 can write backup data corresponding to allocated blocks 312 according to the method described in FIG. 6 below.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
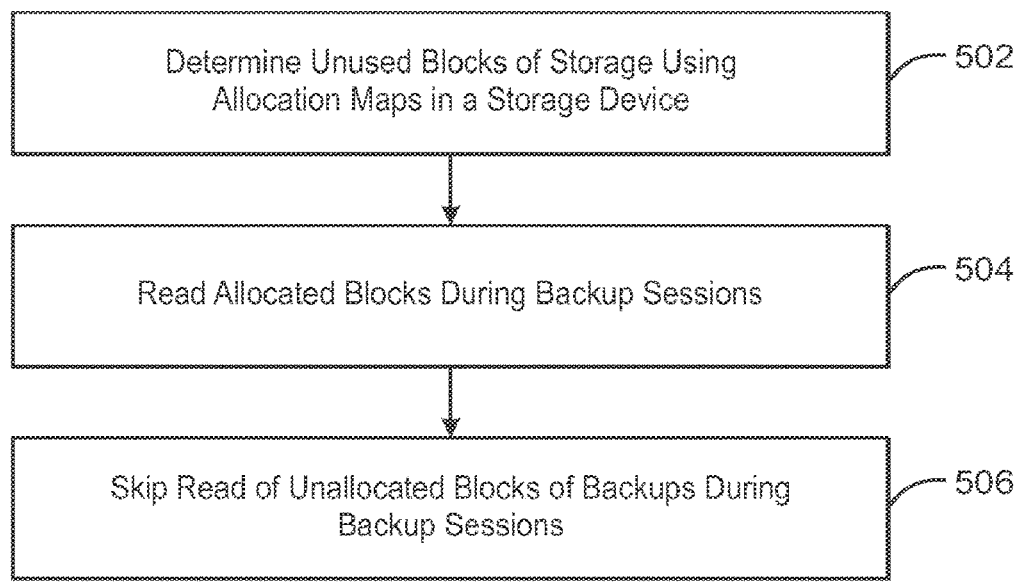
FIG. 5 is a process flow diagram of an example method of reading files from a backup using a block device presentation, in accordance with an example implementation of the present techniques.

FIG. 5 is a process flow diagram of an example method of reading a file from a backup using a block device presentation, in accordance with an example implementation of the present techniques. The method is referred to by the reference number 500, and is described in reference to the example systems of FIGS. 2 and 3.

The method begins at block 502, wherein a virtual machine 124 determines unused blocks 312 of storage 202 using allocation maps 126 in a storage device. In some examples, the storage device is an object store 232. For example, the virtual machine 124 can receive a read request in SCSI block command set (SBC) format. In some examples, the virtual machine 124 determines the address of unallocated blocks 314 prior to reading the requested backups 302.

At block 504, the virtual machine 124 reads allocated blocks 312 during backup sessions. For example, a backup 302 may have allocated blocks 312 at the beginning and end of a logical space as depicted in FIG. 3. The virtual machine 124 can read the first allocated portion of the backup, skip reading the first set of unallocated blocks 314, read the second allocated portion 312 of the backup 302, skip reading the second unallocated portion 314 of the backup 302, and then read the final third segment of allocated blocks 312.

At block 506, the virtual machine 124 skips read of unallocated blocks 314 during the backup process. The virtual machine 124 can skip reading unallocated segments of backup objects 234 comprising a backup 302.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
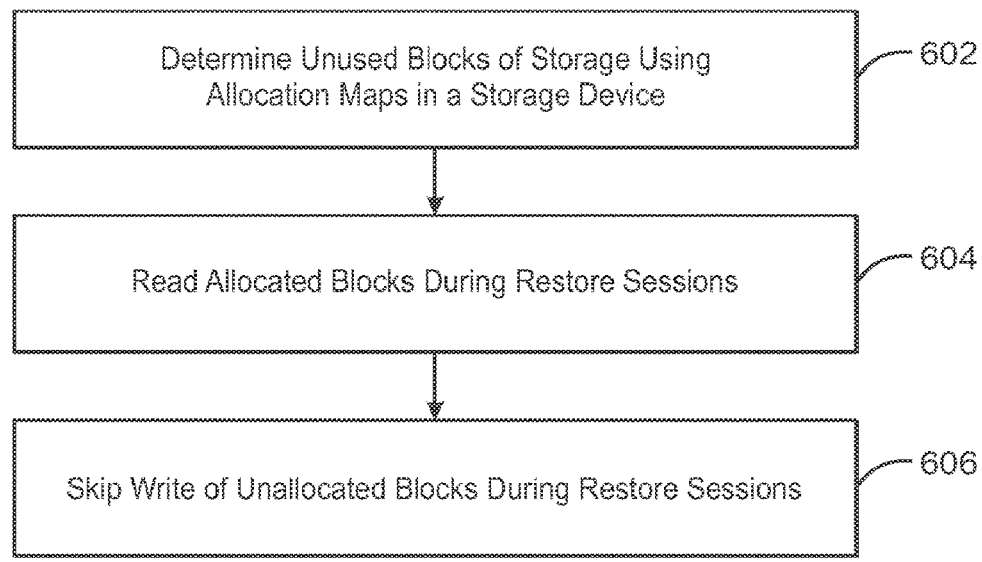
FIG. 6 is a process flow diagram of an example method of writing files from a backup, in accordance with an example implementation of the present techniques.

FIG. 6 is a process flow diagram of an example method of writing a file from a backup using a block device presentation, in accordance with an example implementation of the present techniques. The method is referred to by the reference number 600, and is described in reference to the example systems of FIGS. 2 and 3.

The method begins at block 602, wherein a virtual machine 124 determines unused blocks 314 of storage using allocation maps 126 in a storage device. For example, the storage device can be an object store 232 of a deduplication appliance 203.

At block 604, the virtual machine 124 reads allocated blocks 312 during restore sessions. For example, the virtual machine 124 can read an allocation map 126 corresponding to a snapshot to be restored and read the corresponding allocated blocks 312 of a backup storage 302.

At block 606, the virtual machine 124 skips writes of unallocated blocks 314 during restore sessions. The data corresponding to allocated blocks 312 can be can be sent via an iSCSI connection 310. In some examples, the data from a backup object can be sent via a Fiber Channel (FC) link 310. For example, the data can be included in a response in SBC format.

The process flow diagram of FIG. 6 is not intended to indicate that the operations of the method 600 are to be executed in any particular order, or that all of the operations of the method 600 are to be included in every case. For example, a target disk may be preformatted, in which case block 604 is not to be included. Additionally, the method 600 can include any suitable number of additional operations.

Figure 7:
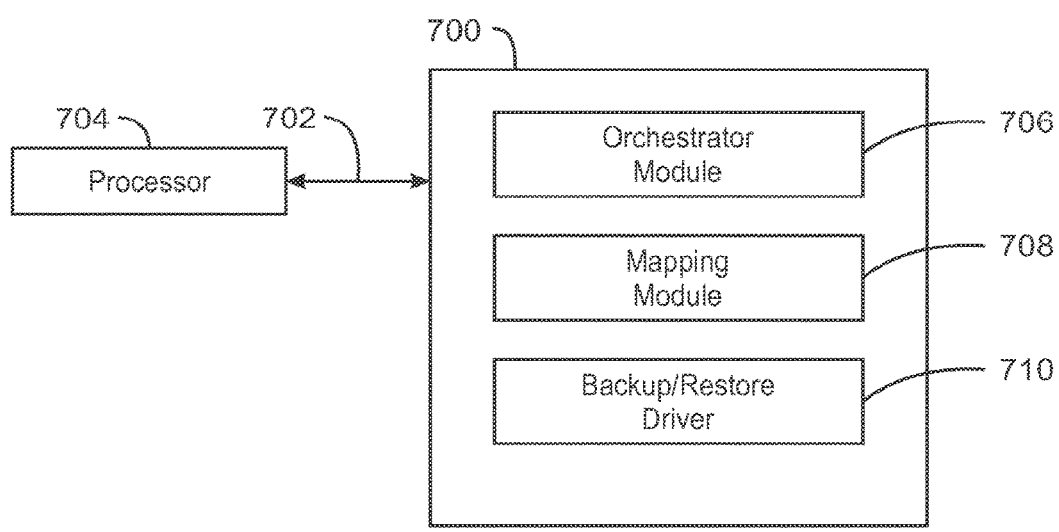
FIG. 7 is a block diagram showing an example non-transitory, machine-readable medium that stores code configured to skip reading and writing unallocated blocks, in accordance with an example implementation of the present techniques.

FIG. 7 is a block diagram showing an example non-transitory, machine-readable medium that stores code configured to provide a block device presentation, in accordance with an example implementation of the present techniques. The non-transitory, machine-readable medium is referred to by the reference number 700. The non-transitory, machine-readable medium 700 can comprise RAM, a hard disk drive, an array of hard disk drives, an optical drive, an array of optical drives, a non-volatile memory, a universal serial bus (USB) drive, a digital versatile disk (DVD), a compact disk (CD), and the like. In example implementations, the non-transitory, machine-readable medium 700 is executed on one or more servers in a server cluster. The non-transitory, machine-readable medium 700 can be accessed by a processor 702 over a communication path 704.

As shown in FIG. 7, the various example components discussed herein can be stored on the non-transitory, machine-readable medium 700. A first region 406 on the non-transitory, machine-readable medium 700 can include an orchestrator module 706 that can perform backups. The orchestrator module can include code to perform a series of scheduled backups and store the backups into backup objects on an object store. In some examples, the backups can be snapshots of a system at different points in time. Another region 708 on the non-transitory, machine-readable medium 700 can include a mapping module 708 that can generate allocation maps. The mapping module 708 can include code to generate an allocation map for one or more backups. An allocation map is a representation of allocated blocks and unallocated blocks of a backup. In some examples, the size of the blocks is adjustable. In some examples, the mapping module 708 can include code to save the allocation map to a storage device. For example, the storage device can be an object store. Another region 710 on the non-transitory, machine-readable medium 700 can include a backup/restore driver 710 that can restore a backup to a target disk from one or more backup objects using the allocation map. For example, the backup objects can be backup objects in an object store of a deduplication appliance. The backup/restore driver 710 can include code to read the allocation map and determine one or more allocated blocks of a backup that may correspond to one or more backup objects. The backup/restore driver 710 can also include code to read the backup using the allocation map to skip reading a plurality of unallocated blocks in the backup. The backup/restore driver 710 includes code to write a file from the backup to a target disk using the allocation map to skip writing zeros corresponding to the plurality of unallocated blocks in the backup. For example, the target disk may be preformatted with zeros. In some examples, the backup/restore driver 710 can include code to format the target disk before writing a file from the backup to the target disk.

Although shown as contiguous blocks, the software components can be stored in any order or configuration. For example, if the computer-readable medium 700 is a hard drive, the software components can be stored in non-contiguous, or even overlapping, sectors.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system, comprising:
one or more processors; and
a memory storing instructions that when executed cause the one or more processors to:
generate an allocation map for a backup of a thin provisioned virtual volume of a disk array, wherein the allocation map is a map that indicates allocated blocks and unallocated blocks of the backup of the thin provisioned virtual volume; and
during a restore session for a file in which data is written from the backup of the thin provisioned virtual volume to a target storage device, read the allocation map to identify the allocated blocks and the unallocated blocks in the backup prior to reading the data from the backup, then write the data from the allocated blocks of the backup, as identified by the allocation map, to the target storage device and skip the unallocated blocks of the backup, as identified by the allocation map, when reading the backup.

2. The system of claim 1, wherein the instructions are executable to cause the one or more processors to further skip writing zeros from the unallocated blocks of the backup to the target storage device.

3. The system of claim 1, the target storage device comprising a formatted disk.

4. The system of claim 1, the disk array comprising an object store in a deduplication appliance.

5. The system of claim 1, the disk array comprising a thin provisioned storage device.

6. A method, comprising:
generating an allocation map for a backup of a thin provisioned virtual volume of a disk array, wherein the allocation map is a map that indicates allocated blocks and unallocated blocks of the backup of the thin provisioned virtual volume;
storing the allocation map in a store; and
during a restore session for a file in which data is written from the backup of the thin provisioned virtual volume to a target storage device, reading the allocation map to identify the allocated blocks and the unallocated blocks in the backup prior to reading the data from the backup, and then writing the data from the allocated blocks of the backup, as identified by the allocation map, to the target storage device and skipping writing zeros from the unallocated blocks of the backup to the target storage device.

7. The method of claim 6, wherein the target storage device is preformatted.

8. The method of claim 6, during a storing session of the file from the backup to a storage, the method comprising:
determining unused blocks of the storage using the allocation map;
reading the allocated blocks during a backup session; and
skipping a read of the unallocated blocks of the backup during the backup session.

9. The method of claim 6, wherein skipping writing zeros from the unallocated blocks of the backup to target storage device comprises:
determine unused blocks of a storage using the allocation map; and
reading the allocated blocks during the restore session;
writing the allocated blocks of the backup to the target storage device.

10. The method of claim 9, further comprising formatting the target storage device.

11. A non-transitory machine-readable storage medium encoded with instructions executable by a processor, the machine-readable storage medium comprising instructions to:
generate an allocation map for a backup of a thin provisioned virtual volume of a disk array, wherein the allocation map is a map that indicates allocated blocks and unallocated blocks of the backup of the thin provisioned virtual volume; and
during a restore session for a file in which data is written from the backup of the thin provisioned virtual volume to a target storage device, read the allocation map to identify the allocated blocks and the unallocated blocks in the backup prior to reading the data from the backup, then write the data from the allocated blocks of the backup, as identified by the allocation map, to the target disk and skip writing zeros corresponding to the unallocated blocks in the backup to the target storage device.

12. The non-transitory machine-readable storage medium of claim 11, further comprising instructions to save the allocation map to an object store.

13. The non-transitory machine-readable storage medium of claim 11, the backup comprising a snapshot.

14. The non-transitory machine-readable storage medium of claim 11, further comprising instructions to format the target storage device before writing the file from the backup to the target storage device.

15. The non-transitory machine-readable storage medium of claim 11, further comprising adjusting a size of blocks in the allocation map.

* * * * *